L. B. Darling.
Cistern.
Nº 29,674. — Patented Aug. 21, 1860.
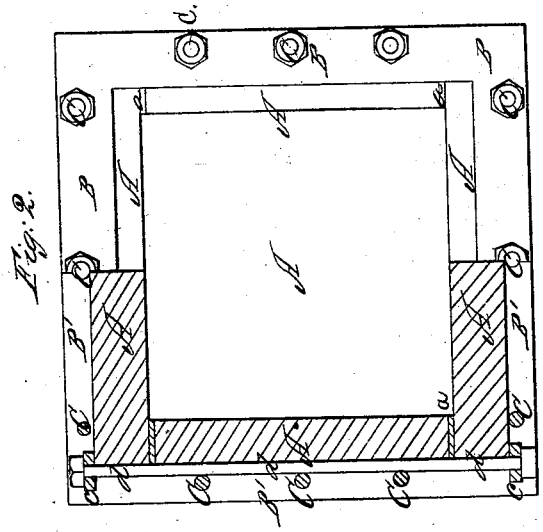
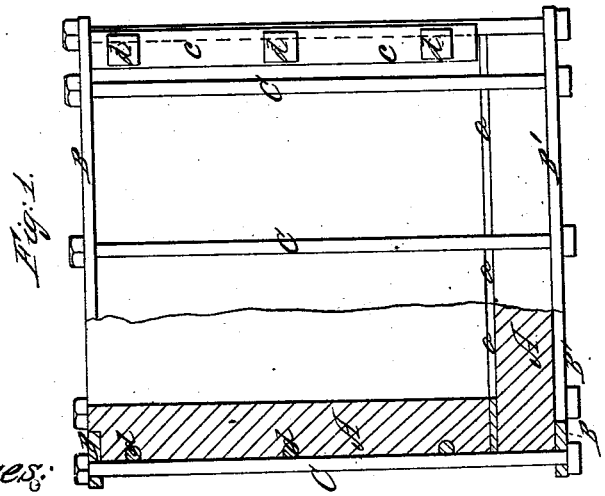
Witnesses:
Inventor:
L. B. Darling
per Munn &
Attorneys

UNITED STATES PATENT OFFICE.

L. B. DARLING, OF PROVIDENCE, RHODE ISLAND.

CONSTRUCTION OF STONE TANKS.

Specification of Letters Patent No. 29,674, dated August 21, 1860.

*To all whom it may concern:*

Be it known that I, L. B. DARLING, of Providence, in the county of Providence and State of Rhode Island, have invented a new and useful Improvement in Constructing Stone Vessels; and I do hereby declare that the following is a full, clear, and exact description thereof, reference being had to the accompanying drawings, making a part of this specification, in which—

Figure 1 shows a side elevation of an improved stone tank, with a portion of one side broken out. Fig. 2 is a top view of the tank with a portion of the top plate removed.

Similar letters of reference indicate corresponding parts in both figures.

To enable those skilled in the art to fully understand my invention, I will proceed to describe the manner of constructing the same.

The slabs of stone A, of any suitable size, shape and thickness, are roughly hewn out and their edges squared and made as even as possible; these slabs should have their edges straight, although the slabs themselves may be quadrangular or triangular. They are then brought together as represented in the drawings, and strips, cords, or tubes of suitable thickness of india rubber are interposed at the joints indicated in the drawings by letter $a$. Then the slabs are all clamped together first with plates $c, c$, and transverse rods $d, d$, that are recessed into the sides so that they will act to a better advantage in drawing the slabs together, and retaining them in a securely confined state. When the corners of the tank are forcibly drawn together by the clamps, the surfaces of the stone at the joints are embedded into the rubber so firmly that perfect water tight joints are formed, at the four seams of the tank. The bottom of the tank which is also a slab of stone is secured with top and bottom plates B, B′, and perpendicular clamping rods C, that serve to some extent to keep the transverse rods in their place. In putting on the bottom of the tank, suitable strips of rubber are used to make a tight joint in the same manner as for the four corner joints. By this employment of plates and clamping rods with india rubber packing, tanks may be constructed which will resist the action of strong, hot or cold acids.

The slabs may be cut out with great facility the proper shape and size, and with sufficient accuracy to answer all required purposes when rubber packing is used to make the joints. Tanks can thus be made of stone with comparatively very little labor or expense, which will be equal to those that are at present dug of solid rock.

I do not wish here to be understood as confining my claim to tanks alone but to any and all vessels of any shape or size where the rubber packing may be advantageously employed, nor do I wish to confine myself to simple strips of rubber cloth to form the packing, for cords or tubes or square strips may be used and clamped between the blocks or slabs of stone in the manner herein described or in any other substantial way.

Having thus described my invention, what I claim as new and desire to secure by Letters Patent, is—

A tank or vessel the bottom and sides of which each consist of one or more pieces or slabs of stone, arranged and combined in the manner herein shown and described with the plates $c$, horizontal rods $d$, plates B, B′, perpendicular rods C and rubber packing ($a$) all as set forth for the purpose specified.

L. B. DARLING.

Witnesses:
M. M. LIVINGSTON,
B. GIROUX.